United States Patent [19]

Kawajiri et al.

[11] Patent Number: 5,006,928
[45] Date of Patent: Apr. 9, 1991

[54] IMAGE PROCESSING METHOD IN AN ELECTRONIC VIDEO ENDOSCOPY SYSTEM

[75] Inventors: Kazuhiro Kawajiri; Takashi Miida, both of Minami; Kiyoshi Inoue, Omiya, all of Japan

[73] Assignee: Fuji Photo Film Co., Ltd., Kanagawa, Japan

[21] Appl. No.: 443,481

[22] Filed: Nov. 30, 1989

[30] Foreign Application Priority Data

Dec. 5, 1988 [JP] Japan .................................. 63-307463
Dec. 5, 1988 [JP] Japan .................................. 63-307464

[51] Int. Cl.$^5$ ........................... A61B 1/04; A61B 1/06; H04N 9/07; H04N 11/22
[52] U.S. Cl. ........................................ 358/98; 358/11; 358/42; 358/43; 358/213.26
[58] Field of Search ........................ 358/98, 42, 213.25, 358/213.26, 43, 11

[56] References Cited

U.S. PATENT DOCUMENTS 4,875,091 10/1989 Yamada .................................. 358/98

Primary Examiner—Howard W. Britton

[57] ABSTRACT

An image processing method for use in an electronic video endoscopy system in which R, G and B surface sequential color signals are obtained from a CCD disposed in the leading end portion of an endoscope. The surface sequential color signals are converted simultaneously wherein memories corresponding to the respective colors are used to thereby obtain synchronous color signals. In the image processing method, the odd and even fields of the CCD are interline transferred sequentially within one field period to thereby obtain the above-mentioned surface sequential color signals, and data for each of horizontal scanning lines are read out alternately from odd and even field data once stored in the above-mentioned respective memories to thereby complete frame data so as to obtain the above-mentioned synchronous color signals.

17 Claims, 5 Drawing Sheets

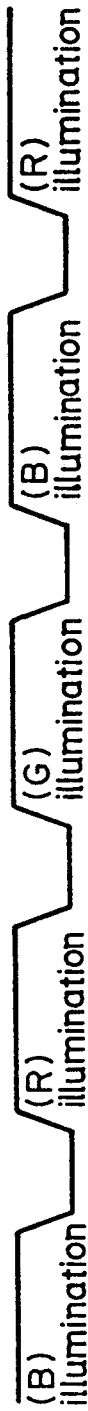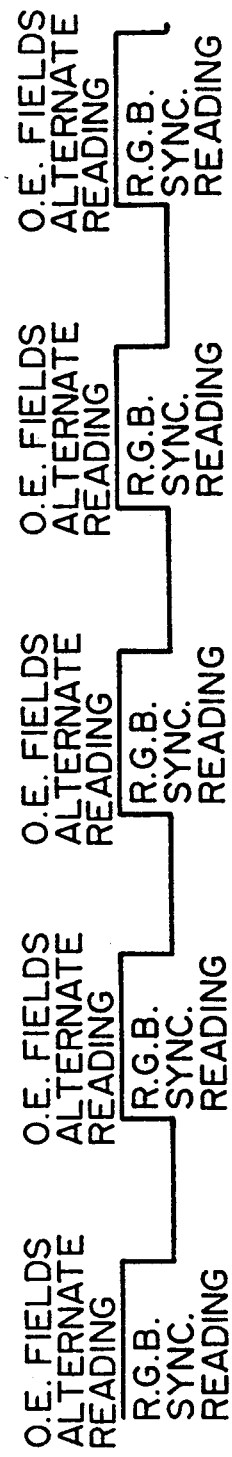

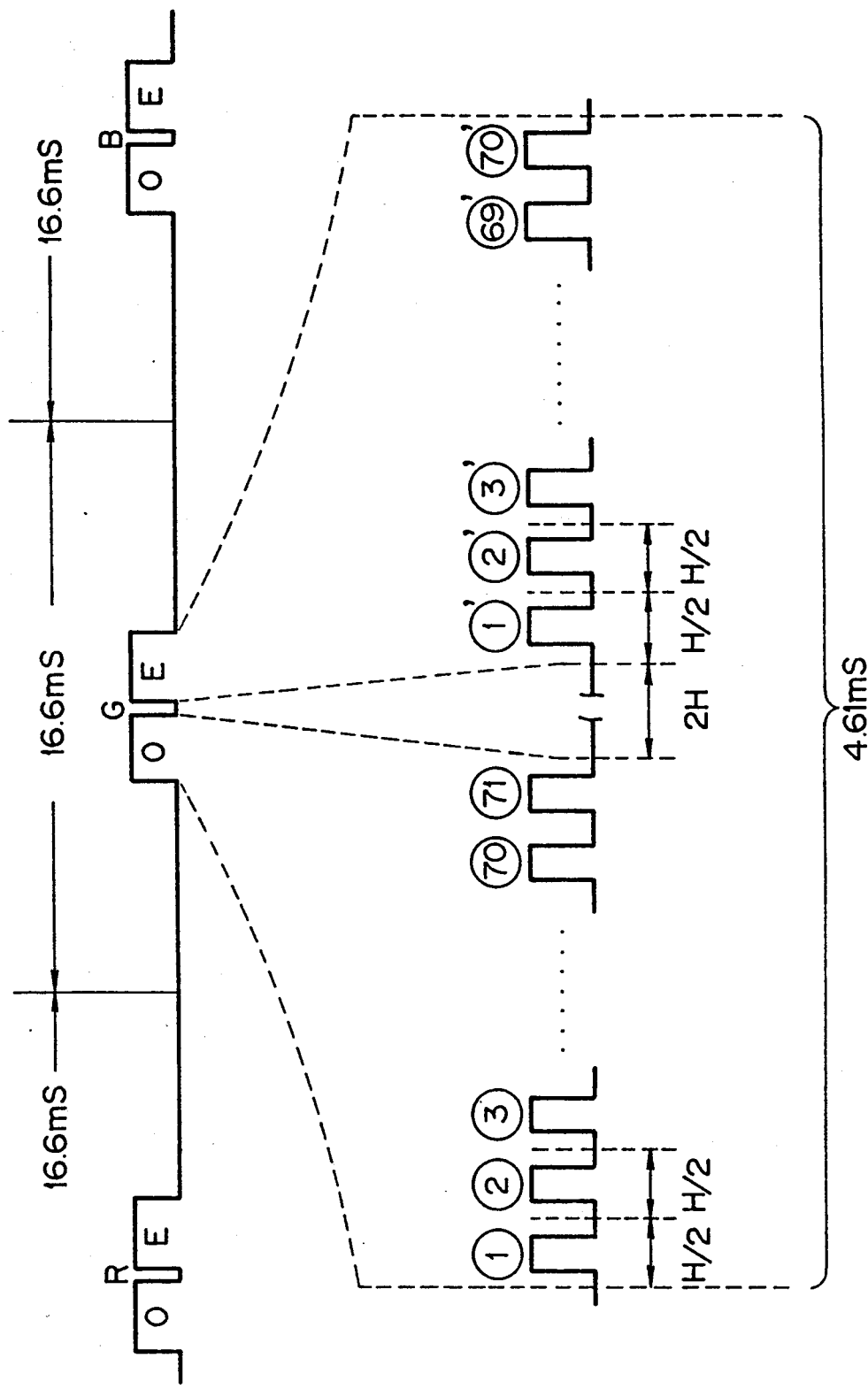

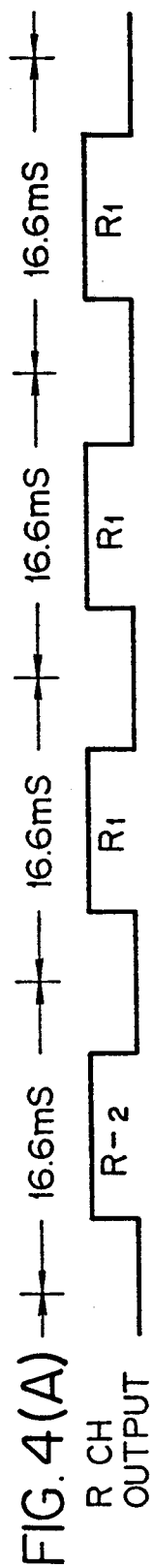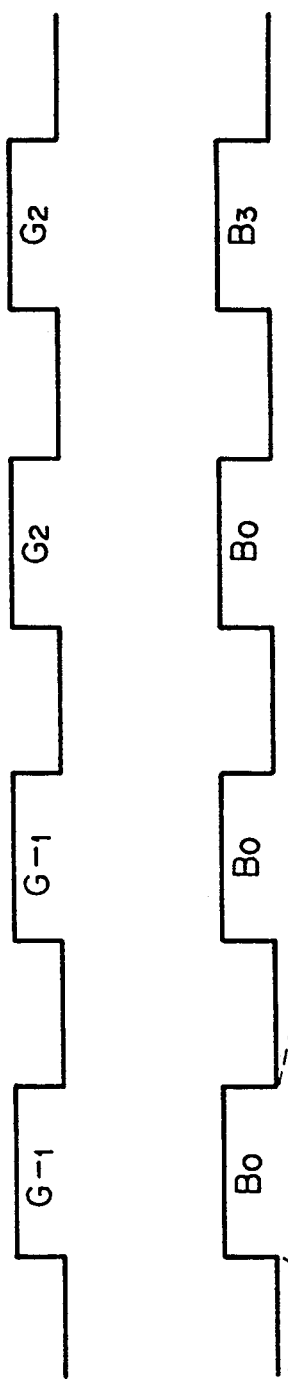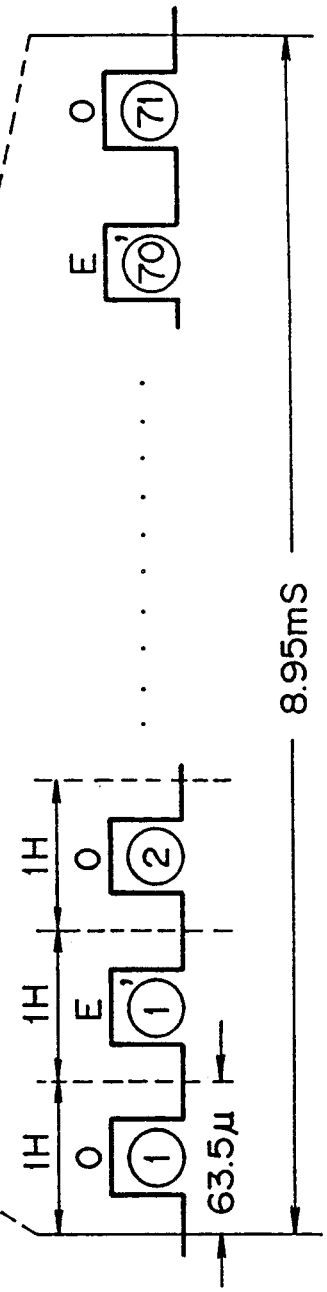

IMAGE PROCESSING METHOD IN AN ELECTRONIC VIDEO ENDOSCOPY SYSTEM

BACKGROUND OF THE INVENTION

1. Field of the Invention

The present invention relates to a method of processing an image in an electronic video endoscopy system which is adapted to pick up an image using a surface sequential technique.

2. Description of the Related Art

Conventionally, there is known an RGB surface sequential technique in which color images corresponding to respective color illumination lights can be obtained sequentially from a single, two-dimension CCD sensor. This technique is effective in a case where two or more two-dimensional CCD sensors cannot be installed and, recently, it has been applied to an electronic video endoscopy system for medical use.

The above-mentioned electronic video endoscopy system is arranged such that it is able to simultaneously convert color image information which has been picked up sequentially and which corresponds correspondingly to illumination lights of red (R), green (G) and blue (B) field memories and which is also able to reproduce the color image information as color images in a color TV.

However, in the electronic video endoscopy system that picks up images using a surface sequential technique, for prevention of line flickers, the field data corresponding to the respective R, G and B color image information must be taken from the same kind of fields. For this reason, according to the prior art, the field data corresponding to either odd or even fields only is read out from a CCD sensor, or both of the odd and even field data are added together and the resultant data is read out at once from the CCD sensor.

Accordingly, the resolution of the CCD in the vertical direction is half of the resolution that the CCD inherently has.

Also, an ordinary electronic video endoscopy system employs a ½-inch or ⅓-inch size optical, full-frame CCD (including 500 (H)×400 (V)=200,000 pixels) for an ordinary TV. However, with the development of an endoscope having a smaller diameter, the CCD that can be applied to such smaller diameter endoscope provides a local observation CCD which has an optical size of the order of 1mm2.

Therefore, if the CCD is operated in a currently-used system, then screen size is determined by the area ratio thereof. That is, when the CCD having an optical size of 1mm2 is used, the screen size thereof becomes too small to be practically effective.

SUMMARY OF THE INVENTION

The present invention aims at eliminating the drawbacks found in the above-mentioned prior art electronic video endoscopy system.

Accordingly, it is an object of the invention to provide an image processing method for use in an electronic video endoscopy system which is capable of enhancing the resolution of a CCD in the vertical direction thereof and also of quadrupling screen size area ratio.

In order to achieve the above object, according to the invention, there is provided an image processing method for use in an electronic video endoscopy system in which RGB surface sequential color signals are obtained from a CCD disposed in the leading end portion of an endoscope, the RGB surface sequential color signals are converted from analog to digital and are then sequentially stored in memories by the respective colors, the stored digital color signals are read out simultaneously to thereby converted into synchronous color signals, and a color image is reproduced by the synchronous color signals, characterized in that the odd and even fields of said CCD are inter-line transferred by turns within one field period (a period of time for one field) to thereby obtain said RGB surface sequential color signals, and data for each of the horizontal scanning lines are read out alternately from odd and even field data stored once in said respective memories to thereby complete frame data so as to obtain said synchronous color signals.

The image processing method is also characterized in that the read-out frequency of the synchronous color signals from said memories is reduced to half with respect to the writing frequency of said RGB surface sequential color signals into said memories, and said synchronous color signals (frame data) are sequentially interlaced into odd and even fields to thereby reproduce said color image.

According to the invention, the odd and even field data of the CCD are sequentially read out within one field period, and the field data are then stored into their corresponding color channel memories respectively. In reading them out from their respective memories, the data are read out per horizontal scan line, alternately, corresponding to the odd and even field data to thereby complete the frame data, before they are output.

Also, the readout frequency from the memory is reduced to half with respect to the writing frequency into the memory, and the thus readout frame data are sequentially interlaced to odd and even fields to reproduce the color image, so that the screen size can be quadrupled in area ratio thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The exact nature of this invention, as well as other objects and advantages thereof, will be readily apparent from consideration of the following specification relating to the accompanying drawings, which are given by way of illustration only, and thus are not limitative of the present invention, in which like reference characters designate the same or similar parts throughout the figures thereof and wherein:

FIGS. 2(A) to (D) are respective timing charts used to explain FIG. 1;

FIG. 3 is a timing chart illustrating in detail the data transfer by means of interlace scanning of a CCD;

FIGS. 4(A) to (C) are respective timing charts used to explain the readout of data from a memory; and, FIG. 5 is an explanatory view illustrating the writing and readout from the respective memories.

DETAILED DESCRIPTION OF THE INVENTION

Detailed description will hereunder be given of the preferred embodiment of an image processing method according to the present invention with reference to the accompanying drawings.

Figure 1:
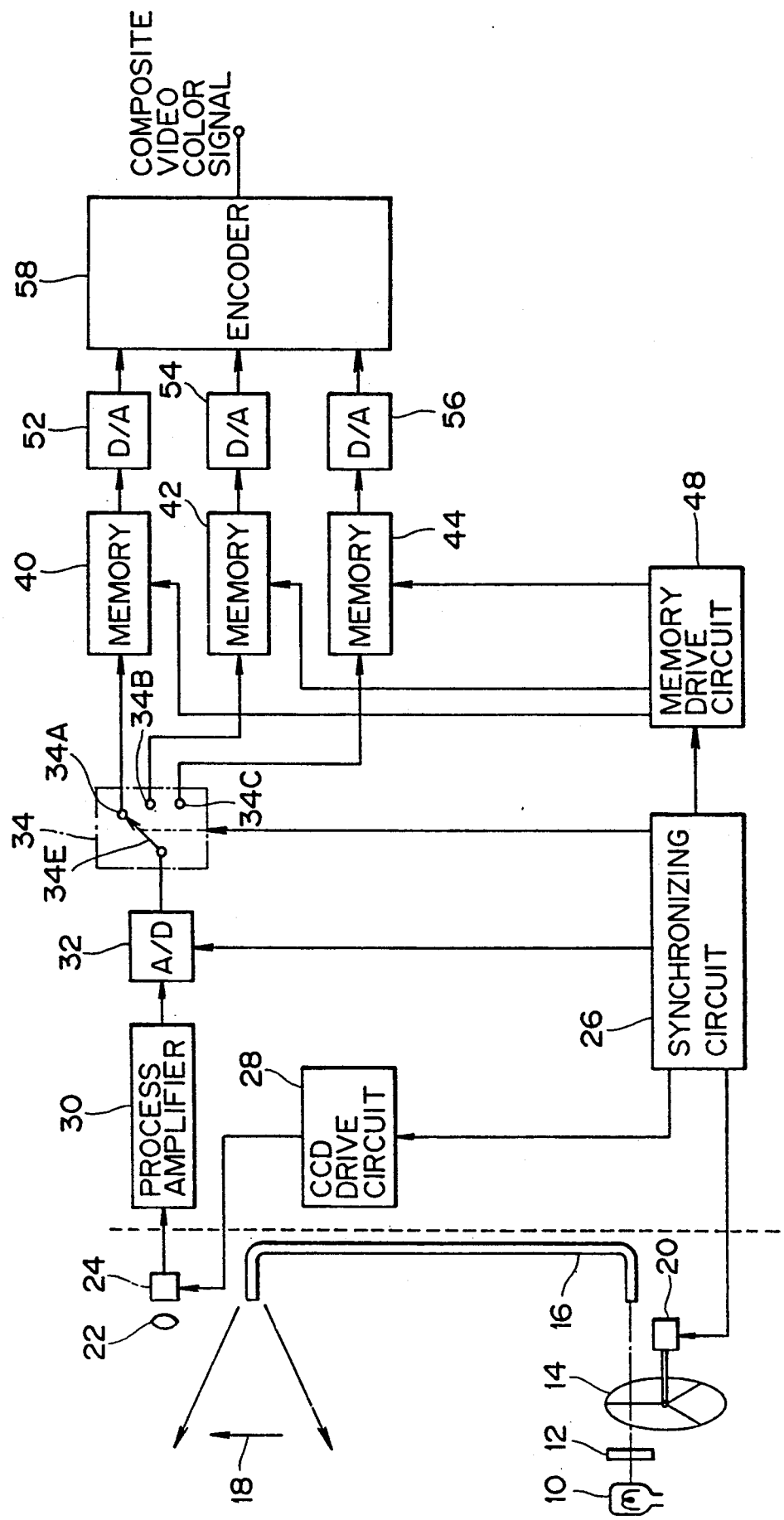
FIG. 1 is a block diagram of an embodiment of an electronic video endoscopy system to which an image processing method according to the invention is applied.

Referring first to FIG. 1, there is shown a block diagram of an embodiment of an electronic video endoscopy system to which an image processing method according to the present invention is applied, in which light from an illumination lamp 10 illuminates an object from the leading end portion of an endoscope through a near infrared removing filter 12, a color filter disc 14 and a light guide 16. In other words, the color filter disc 14 includes a red filter, a green filter and a blue filter each having a central angle of 120° and the disc 14 is rotated at a given speed of rotation (for example, 20 rps) by a motor 20. Due to this, the light from the illumination lamp 10 provides a red (R) illumination light, a green (G) illumination light and a blue (B) illumination light which are sequentially changed through the rotating color filter disc 14 in synchronization with a cycle of 1/60 sec, that is, a cycle of a VD pulse shown in FIG. 2(A), (see FIG. 2(B)), and the three illumination lights are then applied to the object 18 through the light guide 16.

An image pickup lens 22, which is disposed in the leading end portion of the endoscope, is used to photograph the object 18 illuminated by the red, green and blue illumination lights and to allow the thus picked-up object image to be formed in a light receiving part of a CCD 24.

The CCD 24 is an interline CCD which has a size of, for example, 1 mm2 and includes 141 pixels in the vertical direction (V) thereof and 100 pixels in the horizontal direction thereof. The CCD 24 can be driven by a timing pulse which is applied through a CCD drive circuit 28. In other words, referring to the image information that enters the light receiving part of the CCD 24 and is then converted photo-electrically, as shown in FIG. 2 (C), within one field period, the odd and even fields of the CCD 24 are interline transferred by turns, and the odd and even field data thereof are applied through a process amplifier 30 to an A/D converter 32.

Referring here to the above-mentioned interlace scanning in further detail, as shown in FIG. 3, within one field period (16.6 mS), at first, data corresponding to horizontal scan lines ① ~ ⑦ which constitute an odd field (0) is transferred and then data corresponding to horizontal scan lines ① ~ ⑦ ' constituting an even field (E) is transferred.

Also, a transfer time for one horizontal scan line is set to be H/2( ≈31.75 μS) and the transfer time for one frame is reduced to about 4.61 mS ( ≈31.8 μS×141+2H). Here, 2H expresses a discharge period to a vertical transfer passage. In this manner, by reading out the data from the CCD 24 with the transfer rate increased, that is, by interline transferring the data by means of a drive pulse having a frequency in the neighborhood of the maximum drive frequency of the CCD 24, the light illumination time can be increased, so that a sufficient output voltage can be obtained from the CCD 24.

Further, a horizontal transfer (writing) frequency is set to 2 $fsc_{sc}$=7.16 MHz.

The A/D converter 32 is used to convert surface sequential color signals (that is, the analog signals of the above-mentioned odd and even fields) corresponding to the respective illumination lights input therein to digital signals, and to then output these digital signals to a changeover switch 34.

The change-over switch 34 is adapted to output the surface sequential color signals input therein to one of three memories 40, 42 and 44 in a change-over manner, that is, the change-over switch 34 changes its movable contact piece 34E over to contacts 34A, 34B, 34C, 34A, ... sequentially in synchronization with timing pulses of 1 field period applied by a synchronizing circuit 26, and then outputs the surface sequential color signals corresponding to the respective illumination lights to the memories 40, 42 and 44, sequentially.

The three memories 40, 42 and 44 are respectively used to temporarily store the frame data by the respective colors (that is, the odd field data and even field data), and the writing and readout of the frame data thereof are controlled by a control signal given from a memory drive circuit 48.

Next, description will be given below of the writing/read-out control of the memories.

As shown in FIG. 2(C) and FIG. 3, the surface sequential color signals of the odd and even fields are sequentially written into the corresponding memories and, as shown in FIG. 2(D) and FIGS. 4(A) to (C), the R, G and B color signals are read out simultaneously and are converted to synchronous signals.

Also, as shown in FIG. 4, when reading out the odd field data and even field data, the data are read out alternately from the odd fields and even fields by the horizontal scan lines in the order of data of a first horizontal scan line ① of an odd field, data of the first horizontal scan line ① of an even field, data of a second horizontal scan line ② of an odd field, ..., data of a 70th horizontal scan line ⑦ of an even field, and data of a 71st horizontal scan line ⑦ of an odd field, so as to complete one frame data. Of course, during a field period in a TV monitor (16.6 mS, 262.5 lines), a period of readout of each of the horizontal scan lines is 1H (63.5 μS) and a period of readout of one frame data is along the order of 8.95 mS (≈63.5 μS×141). Also, a readout frequency $f_{sc}$ at that time is 3.58 MHz which is half of a frequency used in writing.

Figure 5:
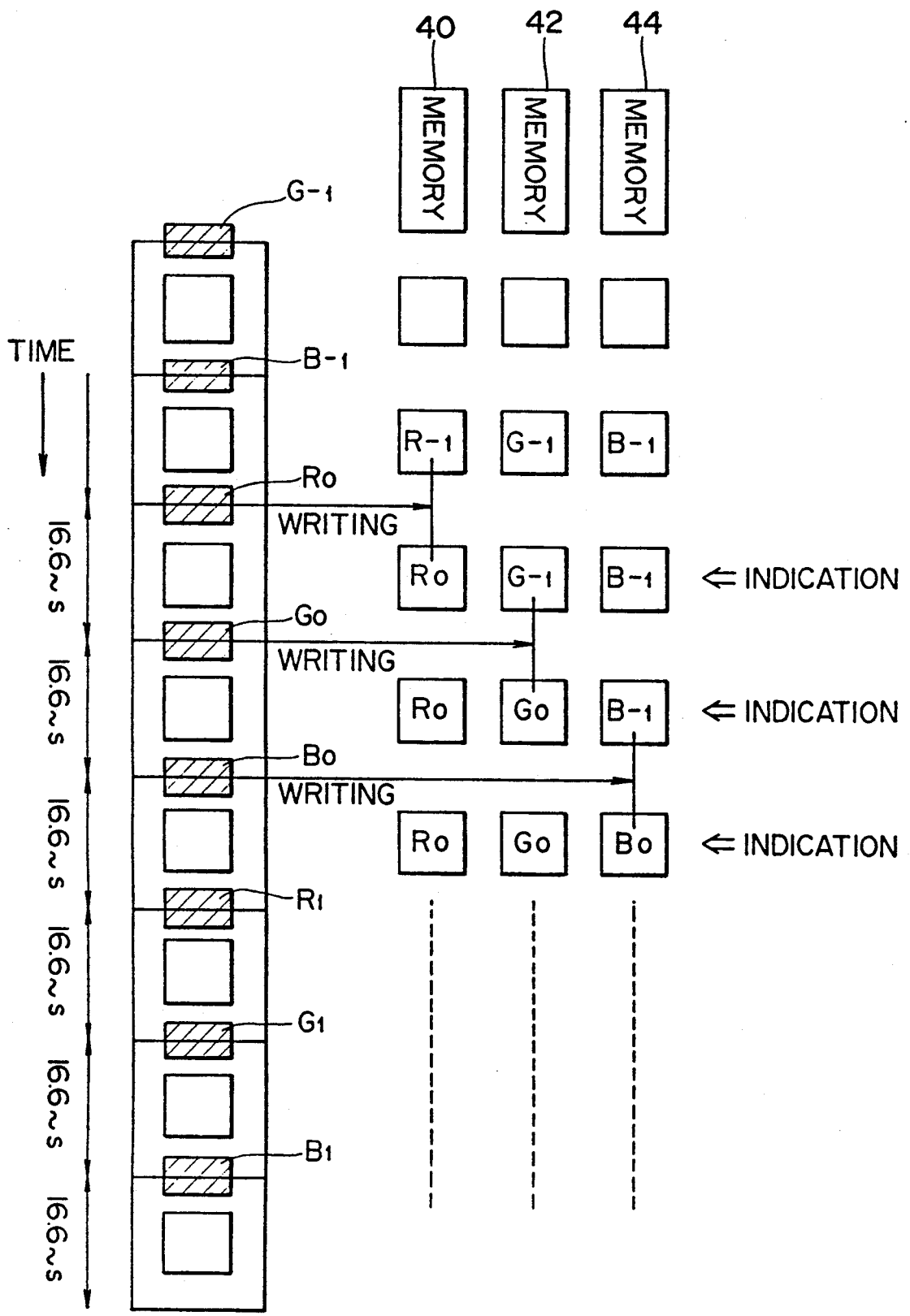

The synchronous color signals, which were simultaneously read out from the above-mentioned memories 40, 42 and 44 and then converted to the synchronous signals, are respectively output to D/A converters 52, 54 and 56. In other words, the memories 40, 42 and 44 output the color signals of their specified colors, respectively. For example, as shown in FIG. 5, from the memories 40, 42 and 44, $R_{-1}$, $G_{-1}$ and $B_{-1}$ color signals are simultaneously read out and displayed. In the next writing, an $R_0$ surface sequential color signal is written into the memory 40 and, in the next readout time, the $R_0$, $G_{-1}$ and $B_{-1}$ color signals are simultaneously read out from the memories 40, 42 and 44.

The R, G and B synchronous color signals that have been converted in the above-mentioned manner are converted by D/A converters 52, 54 and 56 into analog signals, respectively and are then applied to an encoder 58, in which the analog signals are converted to a composite video color signal. The composite color video signal is applied to a color TV and reproduced as a color image thereon.

As described above, according to the invention, due to the fact that the data, that is, the 1 frame data/1 field period data can be obtained from the CCD 24, the resolution in the vertical direction can be doubled. And, if the 1 frame data is interlaced into the odd fields (141 lines) and even fields (141 lines), there can then be provided an image of 282 lines (an image having doubled lines in the vertical direction). Therefore, if the data written in 2 $f_{sc}$ (7.16 MHz) is read out in 1 $f_{sc}$ (3.58 MHz) in the horizontal direction thereof as well, a screen size can be quadrupled in area ratio to a practical size.

As has been described hereinbefore, according to an image processing method in an electronic video endoscopy system according to the present invention, the resolution in the vertical direction can be enhanced and at the same time the screen size can be quadrupled in area ratio so that a CCD having small optical size can be applied to an electronic endoscope. Also, by increasing the transfer rate of the CCD, the electric charge accumulation time of a CCD can be increased.

It should be understood, however, that there is no intention to limit the invention to the specific forms disclosed, but on the contrary, the invention is to cover all modifications or alternate constructions and equivalents falling within the spirit and scope of the invention as expressed in the appended claims.

What is claimed is:

1. An image processing method for use in an electronic video endoscopy system comprising the steps of:
   reading analog R, G, and B surface sequential color signals from a CCD disposed in a leading end portion of an endoscope;
   converting said analog R, G, and B surface sequential color signals to respective digital R, G, and B surface sequential color signals;
   sequentially storing said digital R, G, and B surface sequential color signals in respective memories according to color; and
   reading said stored digital R, G, and B surface sequential color signals simultaneously to convert said read-out stored digital R, G, and B surface sequential color signals into synchronous color signals,
   odd and even field data of said CCD are interline transferred sequentially within a field period to obtain said analog R, G, and B surface sequential color signals and corresponding odd and even field data for each of horizontal scanning lines stored in said respective memories as said stored digital R, G, and B surface sequential color signals are read alternately therefrom to provide said synchronous color signals.

2. An image processing method for use in an electronic video endoscopy system as set forth in claim 1, a reading frequency of said stored digital R, G, and B surface sequential color signals is half that of a writing frequency for storing said digital R, G, and B surface sequential color signals in said respective memories.

3. An image processing method for use in an electronic video endoscopy system as set forth in claim 2, said reading frequency is 3.58 MHz and said writing frequency is 7.16 MHz.

4. An image processing method for use in an electronic video endoscopy system comprising the steps of:
   reading analog R, G, and B surface sequential color signals from a CCD disposed in a leading end portion of an endoscope;
   converting said analog R, G, and B surface sequential color signals to respective digital R, G, and B surface sequential color signals;
   sequentially storing said digital R, G, and B surface sequential color signals in respective memories according to color; and
   reading said stored digital R, G, and B surface sequential color signals simultaneously to convert said read-out stored digital R, G, and B surface sequential color signals into synchronous color signals,
   odd and even field data of said CCD are interline transferred sequentially within a field period by a drive pulse of a frequency substantially equal to a maximum drive frequency of said CCD to obtain said analog R, G, and B surface sequential color signals and corresponding odd and even field data for each of horizontal scanning lines stored in said respective memories as said stored digital R, G, and B surface sequential color signals are read alternately therefrom to provide said synchronous color signals.

5. An image processing method for use in an electronic video system as set forth in claim 4, a reading frequency of said stored digital R, G, and B surface sequential color signals is half that of a writing frequency for storing said digital R, G, and B surface sequential color signals in said respective memories.

6. An image processing method for use in an electronic video system as set forth in claim 5, said reading frequency is 3.58 MHz and said writing frequency is 7.16 MHz.

7. An image processing method for use in an electronic video system comprising the steps of:
   reading analog R, G, and B surface sequential color signals from a CCD;
   converting said analog R, G, and B surface sequential color signals to respective digital R, G, and B surface sequential color signals;
   sequentially storing said digital R, G, and B surface sequential color signals in respective memories according to color; and
   reading said stored digital R, G, and B surface sequential color signals simultaneously to convert said read-out stored digital R, G, and B surface sequential color signals into synchronous color signals,
   odd and even field data of said CCD are interline transferred sequentially within a field period to obtain said analog R, G, and B surface sequential color signals and corresponding odd and even field data for each of horizontal scanning lines stored in said respective memories as said stored digital R, G, and B surface sequential color signals are read alternately therefrom to provide said synchronous color signals.

8. An image processing method for use in an electronic video system comprising the steps of:
   reading analog R, G, and B surface sequential color signals from a CCD;
   converting said analog R, G, and B surface sequential color signals to respective digital R, G, and B surface sequential color signals;
   sequentially storing said digital R, G, and B surface sequential color signals in respective memories according to color; and
   reading said stored digital R, G, and B surface sequential color signals simultaneously to convert said read-out stored digital R, G, and B surface sequential color signals into synchronous color signals, odd and even field data of said CCD are interline transferred sequentially within a field period by a drive pulse of a frequency substantially equal to a maximum drive frequency of said CCD to obtain said analog R, G, and B surface sequential color signals and corresponding odd and even field data for each of horizontal scanning lines stored in said respective memories as said stored digital R, G, and B surface sequential color signals are read alternately therefrom to provide said synchronous color signals.

9. An electronic video endoscopy image processing apparatus comprising:

first reading means, operatively coupled to a CCD disposed in a leading end portion of an endoscope, for reading analog R, G, and B surface sequential color signals therefrom;

analog/digital converting means, coupled to said first reading means, for converting said analog R, G, and B surface sequential color signals to respective digital R, G, and B surface sequential color signals;

memory means, coupled to said analog/digital converting means, for sequentially storing said digital R, G, and B surface sequential color signals according to color; and second reading means, coupled to said memory means, for reading said stored digital R, G, and B surface sequential color signals simultaneously to convert said read-out stored digital R, G, and B surface sequential color signals into synchronous color signals, odd and even field data of said CCD are interline transferred sequentially within a field period to obtain said analog R, G, and B surface sequential color signals and corresponding odd and even field data for each of horizontal scanning lines stored in said memory means as said stored digital R, G, and B surface sequential color signals are read alternately therefrom to provide said synchronous color signals.

10. An electronic video endoscopy image processing apparatus a set forth in claim 9, a reading frequency of said stored digital R, G, and B surface sequential color signals is half that of a writing frequency for storing said digital R, G, and B surface sequential color signals in said memory means.

11. An electronic video endoscopy image processing apparatus as set forth in claim 10, said reading frequency is 3.58 MHz and said writing frequency is 7.16 MHz.

12. An electronic video endoscopy image processing apparatus comprising:

first reading means, operatively coupled to a CCD disposed in a leading end portion of an endoscope, for reading analog R, G, and B surface sequential color signals therefrom;

analog/digital converting means, coupled to said first reading means, for converting said analog R, G, and B surface sequential color signals to respective digital R, G, and B surface sequential color signals;

memory means, coupled to said analog/digital converting means, for sequentially storing said digital R, G, and B surface sequential color signals according to color; and second reading means, coupled to said memory means, for reading said stored digital R, G, and B surface sequential color signals simultaneously to convert said read-out stored digital R, G, and B surface sequential color signals into synchronous color signals, odd and even field data of said CCD are interline transferred sequentially within a field period by a drive pulse of a frequency substantially equal to a maximum drive frequency of said CCD to obtain said analog R, G, and B surface sequential color signals and corresponding odd and even field data for each of horizontal scanning lines stored in said memory means as said stored digital R, G, and B surface sequential color signals are read alternately therefrom to provide said synchronous color signals.

13. An electronic video image processing apparatus comprising:

first reading means, operatively coupled to a CCD, for reading analog R, G, and B surface sequential color signals therefrom;

analog/digital converting means, coupled to said first reading means for converting said analog R, G, and B surface sequential color signals to responsive digital R, G, and B surface sequential color signals;

memory means, coupled to said analog/digital converting means, for sequentially storing said digital R, G, and B surface sequential color signals according to color; and second reading means, coupled to said memory means, for reading said stored digital R, G, and B surface sequential color signals simultaneously to convert said read-out stored digital R, G, and B surface sequential color signals into synchronous color signals, odd and even field data of said CCD are interline transferred sequentially within a field period to obtain said analog R, G, and B surface sequential color signals and corresponding odd and even field data for each of horizontal scanning lines stored in said memory means as said stored digital R, G, and B surface sequential color signals are read alternately therefrom to provide said synchronous color signals.

14. An electronic video image processing apparatus as set forth in claim 13, a reading frequency of said stored digital R, G, and B surface sequential color signals is half that of a writing frequency for storing said digital R, G, and B surface sequential color signals in said memory means.

15. An electronic video image processing apparatus as set forth in claim 14, said reading frequency is 3.58 MHz and said writing frequency is 7.16 MHz.

16. An electronic video image processing apparatus comprising:

first reading means, operatively coupled to a CCD, for reading analog R, G, and B surface sequential color signals therefrom;

analog/digital converting means, coupled to said first reading means, for converting said analog R, G, and B surface sequential color signals to respective digital R, G, and B surface sequential color signals;

memory means, coupled to said analog/digital converting means, for sequentially storing said digital R, G, and B surface sequential color signals according to color; and second reading means, coupled to said memory means, for reading said stored digital R, G, and B surface sequential color signals simultaneously to convert said read-out stored digital R, G, and B surface sequential color signals into synchronous color signals, odd and even field data of said CCD are interline transferred sequentially within a field period by a drive pulse of a frequency substantially equal to a maximum drive frequency of said CCD to obtain said analog R, G, and B surface sequential color signals and corresponding odd and even field data for each of horizontal scanning lines stored in said memory means as said stored digital R, G, and B surface sequential color signals are read alternately therefrom to provide said synchronous color signals.

17. An image processing method for use in an electronic video endoscopy system comprising the steps of:

emitting R, G and B illumination lights from a leading end portion of an endoscope upon an object, said R, G and B illumination lights being sequentially changed every field period;

reading analog R, G, and B surface sequential color signals from a CCD disposed in said leading end portion of said endoscope;

converting said read out analog R, G, and B surface sequential color signals to respective digital R, G, and B surface sequential color signals;

sequentially storing said digital R, G, and B surface sequential color signals in respective memories according to color; and reading said respectively stored digital R, G, and B surface sequential color signals simultaneously to convert said read-out respectively stored digital R, G, and B surface sequential color signals into synchronous color signals, odd and even field data of said CCD are interline transferred sequentially within said field period to obtain said analog R, G, and B surface sequential color signals and data for each of horizontal scanning lines are read out alternately every horizontal scanning line between odd and even field data stored in said respective memories to provide said synchronous color signals.

* * * * *